(12) United States Patent
Ziemczonok et al.

(10) Patent No.: US 12,326,401 B2
(45) Date of Patent: Jun. 10, 2025

(54) REFRACTIVE INDEX DISTRIBUTION STANDARD

(71) Applicant: POLITECHNIKA WARSZAWSKA, Warsaw (PL)

(72) Inventors: Michal Ziemczonok, Warsaw (PL); Arkadiusz Kus, Warsaw (PL); Malgorzata Kujawinska, Lomianki (PL)

(73) Assignee: POLITECHNIKA WARSZAWSKA, Warsaw (PL)

( * ) Notice: Subject to any disclaimer, the term of this patent is extended or adjusted under 35 U.S.C. 154(b) by 244 days.

(21) Appl. No.: 17/595,574

(22) PCT Filed: May 20, 2020

(86) PCT No.: PCT/IB2020/054772
§ 371 (c)(1),
(2) Date: Nov. 19, 2021

(87) PCT Pub. No.: WO2020/234791
PCT Pub. Date: Nov. 26, 2020

(65) Prior Publication Data
US 2022/0228979 A1 Jul. 21, 2022

(30) Foreign Application Priority Data
May 21, 2019 (PL) .......................... 429994

(51) Int. Cl.
 *G01N 21/41* (2006.01)
(52) U.S. Cl.
 CPC ......... *G01N 21/41* (2013.01); *G01N 2201/13* (2013.01)

(58) Field of Classification Search
 CPC ... G01N 21/41; G01N 2201/13; G01N 21/278
 (Continued)

(56) References Cited

U.S. PATENT DOCUMENTS 6,316,153 B1\* 11/2001 Goodman ............ A61K 9/0097
 430/311
7,570,362 B2\* 8/2009 Dosaka .................. G01N 21/43
 356/128

(Continued)

FOREIGN PATENT DOCUMENTS

| WO | WO2009056560 | 5/2009 | |
| WO | WO-2009056560 A2 \* | 5/2009 | ........... G01N 21/278 |
| WO | WO2013126554 | 8/2013 | |

OTHER PUBLICATIONS

PCT Search Report and Written Opinion prepared for PCT/IB2020/054772, completed Sep. 23, 2020.

*Primary Examiner* — Isiaka O Akanbi
(74) *Attorney, Agent, or Firm* — Barnes & Thornburg LLP

(57) ABSTRACT

Refractive index distribution standard in the form of a three-dimensional object which contains in its volume a base medium and regions of variable size and distance with a refractive index other than that of the base medium, characterised in that the difference between the refractive index of said regions and the refractive index of the base medium is not greater than 0.04, at least one of the regions is a set of at least two prisms or cylinders or coaxial rings of variable size and distance, having a dimension in at least one direction similar to the resolving power of the measurement system under assessment and at least one of the regions is sphere-like or ellipsoid-like in shape.

10 Claims, 4 Drawing Sheets

Figure 1:
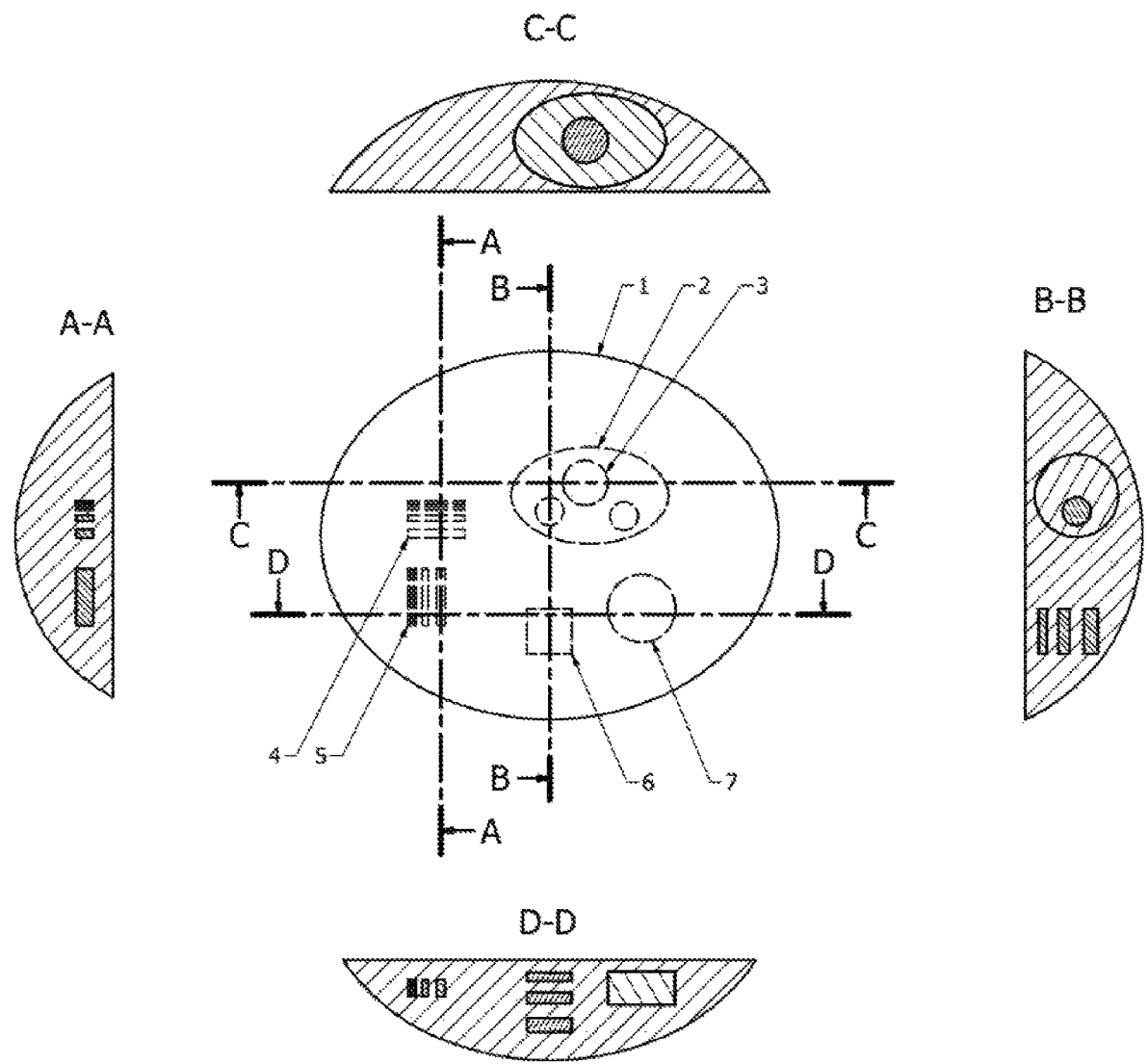

(58) Field of Classification Search
USPC .................................................. 356/128, 457
See application file for complete search history.

(56) References Cited

U.S. PATENT DOCUMENTS

| | | | | |
|---|---|---|---|---|
| 7,790,353 | B2* | 9/2010 | Fleming | G11C 7/00 430/281.1 |
| 8,823,927 | B2* | 9/2014 | Chan | G01M 11/0235 356/128 |
| 11,085,864 | B2* | 8/2021 | Grier | G06V 10/143 |
| 2005/0208431 | A1* | 9/2005 | Devoe | G03F 7/2053 430/290 |
| 2008/0278713 | A1* | 11/2008 | Backman | G01N 21/49 356/128 |
| 2010/0056775 | A1* | 3/2010 | Tomura | C07D 519/00 540/121 |
| 2010/0261811 | A1* | 10/2010 | Thomas | G01N 21/278 717/124 |
| 2011/0300490 | A1* | 12/2011 | Rachet | G02B 26/0833 359/385 |
| 2014/0333935 | A1* | 11/2014 | Grier | G02B 21/361 356/457 |
| 2015/0015872 | A1* | 1/2015 | Kole | G01N 21/278 356/128 |
| 2015/0062587 | A1* | 3/2015 | Shpaisman | G01N 15/1456 356/457 |
| 2018/0154380 | A1* | 6/2018 | Doak | B05B 1/04 |

\* cited by examiner

REFRACTIVE INDEX DISTRIBUTION STANDARD

CROSS-REFERENCE TO RELATED APPLICATIONS

This application is the U.S. national phase of PCT/IB2020/054772, filed on May 20, 2020, which claims the benefit of Polish Patent Application Serial Number P.429994, filed on May 21, 2019, the entire disclosures of both of which are incorporated herein by reference.

The invention relates to a three-dimensional refractive index distribution standard, which in its volume comprises a number of regions with different refractive index values. The standard is intended for use in the process of metrological evaluation of results obtained from measurement devices sensitive to the refractive index.

3D quantitative phase imaging techniques are used to visualise and measure transparent, technical and biological microobjects based on local differences in refractive index value in the measurement volume. The group of 3D quantitative phase imaging techniques includes holographic tomography (also known as optical diffraction tomography or optical phase tomography), which, in a configuration with a change in the illumination direction of the sample (in a limited angular range of projections), is rapidly rising in popularity especially in biomedical applications due to the correlation between the refractive index and the density of biochemical components present in cells or tissues. Based on a set of holographic projections recorded at different illumination directions, a reconstruction of the 3D distribution of the refractive index of a given measured, unknown transparent object is performed. From the reconstructed three-dimensional refractive index distributions, selected intracellular structures can be delineated and measured, as well as changes in morphology and statistics of mass density distribution over time induced by internal processes or various external stimuli can be monitored. This method is used to study biological structures such as single cells (e.g. blood cells and human cancer cells), cell colonies or even tissues. Other advantages of this technique include a possibility of measuring live biological microstructures directly on a Petri dish, no need for using additional dyes or markers, as well as high spatial resolution of the obtained tomographic reconstructions. The value of this measurement technique is reflected in the recently introduced commercial holographic tomography microscopes for biomedical applications offered by NanoLive, Ltd and TomoCube, Inc.

Holographic tomography setup with a limited angular range of projections is the most practical solution for the applications listed above, nevertheless, it involves a number of issues. Quantitative information, which is one of the key advantages of holographic tomography, is burdened with errors introduced at each stage of the measurement process, related e.g. to artifacts due to the so-called "missing cone" in data representing information about the object (reference to the representation of object's spatial frequencies in the three-dimensional Fourier space), anisotropic resolution, as well as mapping errors of spatial frequencies recovered from individual projections into the three-dimensional Fourier space. It is difficult to verify experimentally the accuracy of reconstruction, since the 3D structure of a biological object is not known before the measurement.

There are a number of technological and numerical solutions aimed at minimising or compensating for the impact of these factors on the final result of the refractive index reconstruction, but it is challenging to quantify their effectiveness. Both equipment manufacturers and research groups developing this measurement technique are addressing the issue pertaining to the metrological assessment of reconstruction errors based on numerical simulations or experimental results, however, the solutions proposed so far are insufficient for two major reasons. In regards to theoretical work or numerical analyses, the data is not burdened by errors resulting from imperfections in the measurement system or the measurement process itself, and therefore cannot be used for comprehensive characterisation of the device. A second example of metrological analysis of systems from literature involves conclusions drawn based on measurements of unknown objects (i.e. no reference for the measurement error assessment) or too simple ones. The solutions presented in the literature are based on the estimation of the refractive index error based on the standard deviation of the integrated phase values in the background of individual projections or the statistics of refractive index in the background of tomographic reconstruction, as well as on the use of microspheres as a test object, which can serve as simple calibration objects, though without providing sufficient complexity necessary to experimentally simulate the complex internal structure of biological specimen. Other tomographic techniques (e.g. computed tomography, magnetic resonance imaging) for calibration and metrological analyses use standards and phantoms, however, hitherto no corresponding solution has been disclosed for quantitative 3D phase imaging that would be free from all the disadvantages referred to above. The main reasons behind the difficulty in obtaining such a standard are the limitations of available manufacturing technologies and the necessity to verify the obtained standard's parameters.

An attempt to solve this problem was made by M. Ziemczonok, A. Kuś, M. Nawrot, M. Kujawińska, (*Characterization of 3D phantom for holographic tomography produced by two-photon polymerization*, (SPIEDigitalLibrary.org/conference-proceedings-of-spie)—the publication describes structures having a variable refractive index made using the two-photon polymerization method as well as measurements of these structures made using 2D and holographic tomography.

Two-photon polymerization (TPP) is a 3D printing technology that enables creation of complex, transparent structures with a submicrometric resolution. These structures are made out of photoreactive, liquid precursors containing chemical substances that change from liquid to solid when exposed to light. The refractive index of cured polymer depends on the degree of crosslinking of the monomer, which refers to the exposure dose applied. In TPP, point by point scanning enables to create a structure with any desired distribution of the refractive index in a three-dimensional space. The structure is given a specific three-dimensional distribution of the refractive index value by curing a photosensitive material using a focused laser beam in the vicinity of the focus of said beam, and then moving the focus of the beam relative to the container with the material until the entire desired volume is cured. Since the probability of two-photon absorption process depends on the intensity of the incident radiation, the material is cured in a small volume limited in three dimensions and exclusively in the vicinity of said focus. The value of the refractive index at any point (voxel) of the standard depends on the degree of polymerization of the material and can be modified by controlling process parameters, in particular by locally changing polymerization laser power, increasing exposure time, changing scanning rate or voxel arrangement density. Moreover, selected regions of the standard may remain uncured, which increases the available modulation range of refractive index values and allows for obtaining structures smaller than resulting from the size of a voxel.

The structure described in the publication by M. Ziemczonok et al. had the shape of a pyramid, with distribution of the refractive index varying across the steps. Such a structure is not well suited for the evaluation of measurement systems for biomedical applications, as it is not related to the object being measured, such as e.g. a cell.

The aim of the invention was therefore to develop a refractive index distribution standard intended for evaluation of measurement systems for biomedical applications.

The refractive index distribution standard according to the invention is a three-dimensional object, which comprises within its volume a base medium and regions of variable size and distance, with a refractive index different than the refractive index of the base medium, wherein the difference of the refractive index of said region relative to the refractive index of the base medium is not greater than 0.04. At least one of the regions is a set of at least two prisms or cylinders or coaxial rings of variable size and distance, having a dimension in at least one direction similar to the resolving power of the measurement system, and at least one of these regions has a shape similar to an ellipse or sphere.

Preferably, at least one sphere-like or ellipse-like region is located within another region with a different refractive index relative to the sphere-like or ellipse-like region and relative to the base medium.

Preferably, the region in the form of coaxial rings contains rings with a diameter ranging from 1 μm to 50 μm, with a thickness of each of the rings close to the resolving power of the measurement system to be evaluated.

Preferably, the standard contains a set of at least two cuboids arranged parallel to each other.

Preferably, the standard contains a set of prisms arranged in a relation to each other similar to a Siemens star.

The sets of cuboids or cylinders or coaxial rings are intended for the evaluation of the resolution of the measurement system.

Preferably, at least one of the regions has a gradient-based variation of the refractive index, with a maximum refractive index variation range of 0.02. Preferably, regions with a gradient change in the refractive index have the shape of a cuboid or cylinder.

Preferably, the standard has external dimensions in the range from 5 μm to 300 μm in each of the three directions, selected according to the optimal use of the available field of view of the evaluated system. Preferably, each of the internal regions of the standard with a different refractive index has dimensions in the range from 50 nm to 250 μm in each of the three directions.

The differences in the refractive indices of the individual regions are in the range from 0.001 to 0.04 and are selected based on the sensitivity and measurement range of the system under consideration.

Preferably, the standard has a shape similar to a truncated ellipsoid.

The absolute values of the refractive index of the standard material range from 1.45 to 1.60.

In a preferable embodiment, the standard represents structures and ranges of refractive index variation found in biological specimens, especially cells. The standard has regions representing spherical nuclei suspended in a region with a lower refractive index representing the cell nucleus, as is common in cells. These areas are used to verify the accuracy of distinguishing the boundaries of internal structures of the objects under study, which in turn allows for determining key parameters such as volume, area, or average value of the refractive index of selected internal structures.

Moreover, such a standard comprises a cylindrical region with a gradient variation profile of the refractive index. This region represents natural, minor variations in the light refraction index of cells and is useful for the evaluation of tomography reconstruction algorithms which may be based on wrong assumptions regarding the nature of the variation of the refractive index inside an object. For example, the effectiveness of proper reconstruction of such region will be poor if applied reconstruction algorithm assumes that the refractive index of an object is piecewise constant.

Furthermore regions intended for the assessment of resolution, for example in the shape of cuboids, are a solution similar to the so-called USAF resolution test chart. This test requires at least two regions to assess resolution. If the result of the measurement allows to state presence of two regions, this means that the resolution of the system in the direction under consideration is at least equal to the distance between the centres of these regions. Gradually increasing the number of regions along with their width and distance allows for more cases to be covered and, as a result, for easier or more accurate determination of the lower and upper resolution limit of the system. Each direction should be verified separately, hence there are three sets of regions for evaluating resolution in the standard. Preferably, the sets are oriented along the X,Y,Z axes. The resolution of systems along the optical axis direction (Z) is usually poorer (both at printout and in the measurement systems under consideration), so the test in this direction is usually slightly different (with a greater distance between the elements).

Most preferably, the standard has three spherical regions with a refractive index of 1.48 to 1.52 suspended in a region with a refractive index of 1.50 to 1.52, and three sets of regions in the shape of cuboids with a refractive index of 1.48 to 1.52. In each set, the cuboids are parallel to each other, and the sets are arranged in three perpendicular directions along the X,Y,Z axis. Moreover, in the most preferable embodiment, the standard has one cylinder-shaped region with a gradient change in refractive index within the range of between 1.50 and 1.52.

The standard according to the invention provides a complex three-dimensional distribution of the refractive index, which is used for metrological evaluation of 3D quantitative phase imaging systems by comparing the obtained measurement results with the detailed specification of the standard.

The parameters of the features of the standard, such as shape, external dimensions, internal structures (size, shape, distribution, contrast of the refractive index relative to the environment), ranges of refractive index values or the nature of the variability of the refractive index derive from the parameters of the measurement system under consideration (its resolution, field of view, sensitivity to the refractive index), the expected application of the system (what parameters and performance characteristics will be representative of typical measured objects), and the capabilities and limitations of the manufacturing technique. Such freedom of feature selection and the possibility of scaling the standard up or down or adapting it to specific needs is undoubtedly an advantage of the invention.

The standard according to the invention comprises structures allowing to assess the resolution of the measurement system. Based on the reconstruction of the refractive index distribution, it is possible to assess the resolving power using a selected qualitative or quantitative criterion. Regions with different refractive index values form a three-dimensional internal structure, such as ellipsoids with a higher refractive index suspended within a larger ellipsoid with a lower refractive index contained in the volume of the standard. These structures are used to assess the ability of the measurement system to delineate the boundaries of internal structures, as well as the error of the obtained refractive index value.

Said internal structures may have a strictly predefined refractive index distribution, including a step-based or gradient-based nature of variations thereof, as the tomographic reconstruction algorithms or regularization techniques used may follow assumptions which are not met or are only partially met by the object. Thus, the standard allows for an experimental analysis of errors resulting from such object-dependent artifacts.

The standard according to the invention is made on a substrate, e.g. a high-precision cover slip, and subsequently surrounded with an immersion having a selected refractive index (such as air, a drop of water or oil, optionally covered with another cover slip), and placed in the test system. Measurement and reconstruction are then conducted in accordance with a procedure suitable for the system, after which the results (of individual structures, features) are compared with the distribution as designed or measured by reference techniques.

The standard according to the invention is made in the technology of two-photon polymerization, wherein the control of manufacturing parameters induces a local change in the refractive index. The manufacturing technology allows for the standard to be adapted for measurements to obtain reference data by placing it on a cover slip (electron microscopy, spectroscopy, limited angle holographic tomography) or on a tip of the optical fiber (observation from another perspective, tomography with rotation of the measured sample).

Polymers for two-photon polymerization are well known to specialists, e.g. from Alexandros Selimis, Vladimir Mironov, Maria Farsari, Direct laser writing: Principles and materials for scaffold 3D printing, Microelectronic Engineering 132 (2015) 83-89. Generally, a material suitable to be structured by two-photon polymerisation includes at least two components: (i) a monomer or mixture monomers/oligomers which form the final polymer and (ii) a photoinitiator which absorbs laser light. The final polymer can be selected from the group of acrylic, epoxy, silicone photopolymers, natural and synthetic hydrogels such as polyethylene glycol or natural proteins cross-linked with hyaluronic acid, and it can also be polycaprolactone or polylactide. A branched acrylic monomer and α-aminoketone are preferably used as the photoinitiator to produce the standard, but any polymer intended for two-photon polymerization can be used.

Generally, the standard's material may be any polymer that complies with the following criteria:
   is polymerized/cured under UV radiation,
   has sufficient transmission of radiation used in the TPP process, usually with the photon energy being half of that for single-photon (UV) polymerization; in other words, the beam is not intensely absorbed by the volume of material between the microscopic lens and its focal point, so that the maximum intensity of the beam is in the focal point thereof,
   has a transmission close to 100% for the radiation used in the measurement system tested (phase nature of the object, advantageous for the measurement techniques under consideration).

Preferably, materials are used that are recommended by manufacturers of manufacturing systems due to their further optimisation in terms of physical and chemical properties, including their homogeneity, shrinkage, and available recommendations for possible steps necessary during preparation for printing (e.g. evaporation of the solvent) or after printing (removal of excess material, heating).

Figure 2:
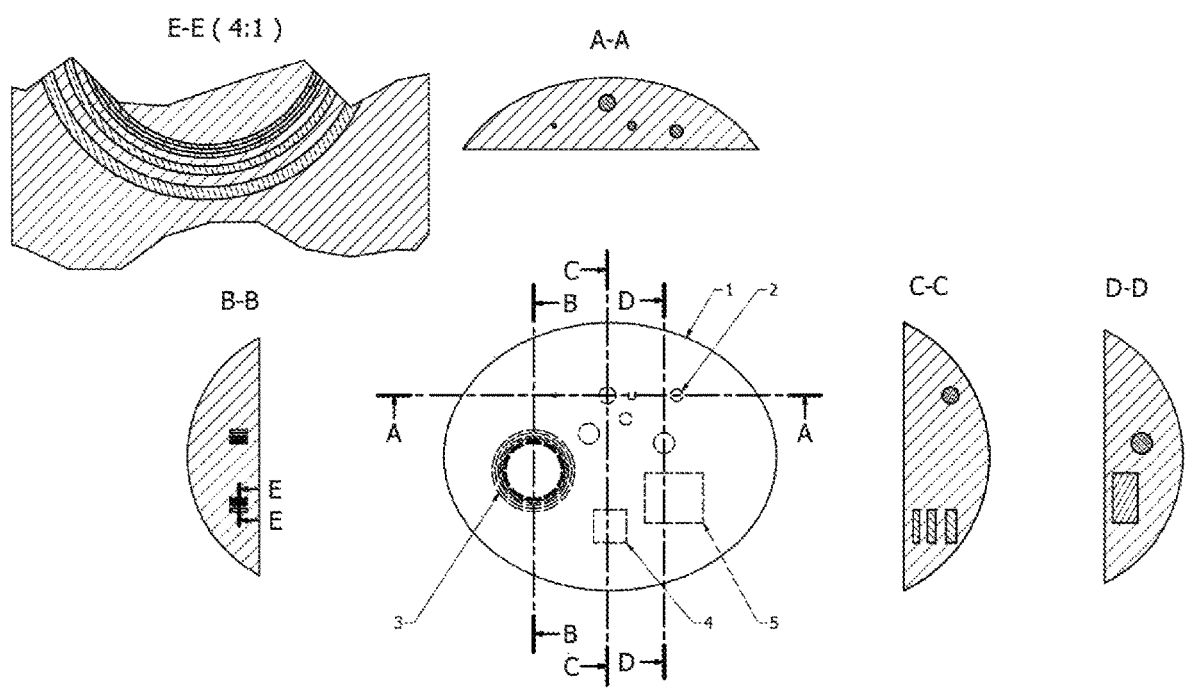
Figure 3:
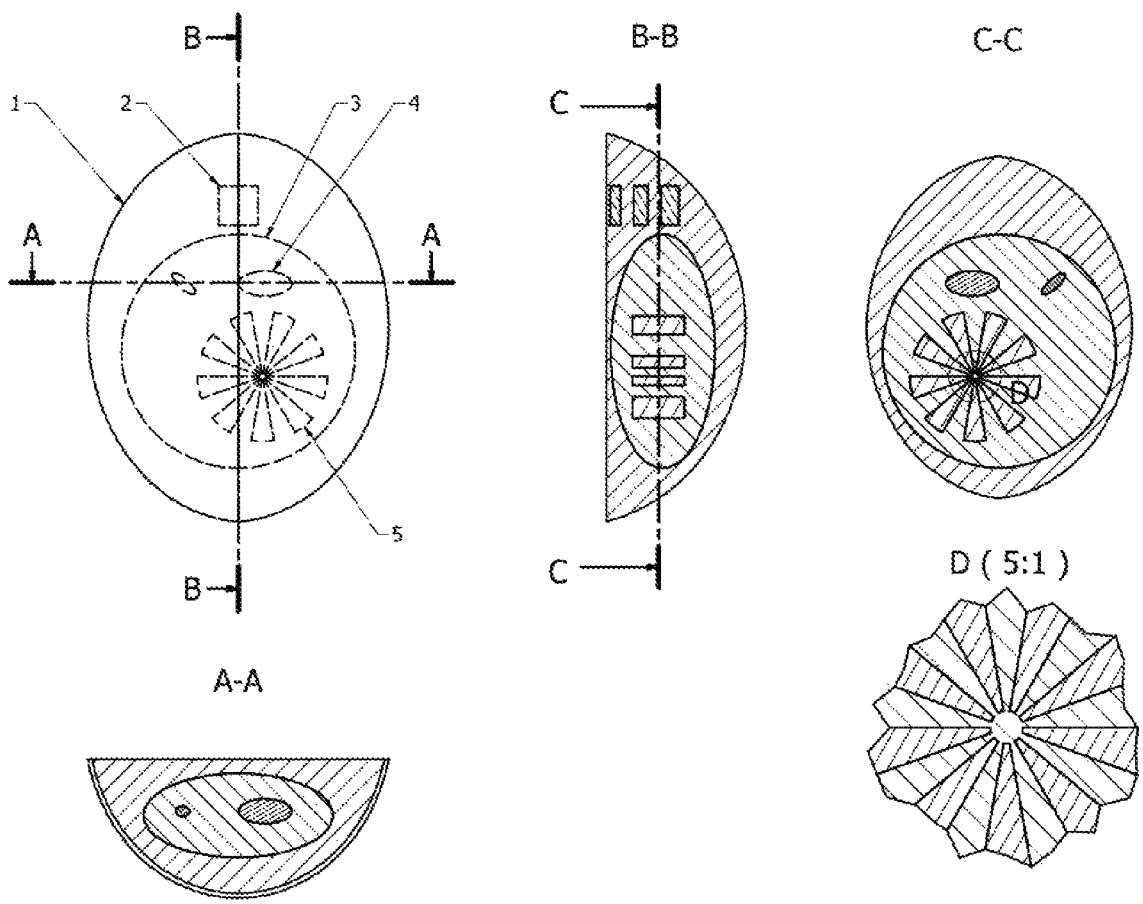
Figure 4:
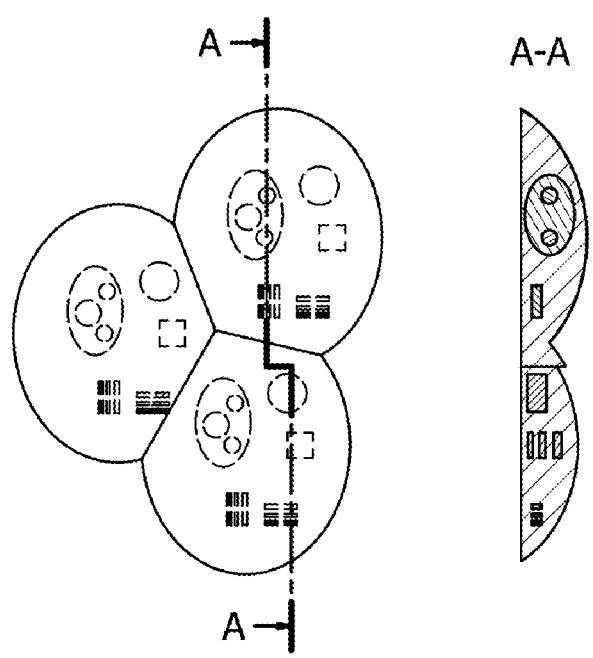

The standard according to the invention is shown in the exemplary embodiments in the drawing, where:

FIG. 1 is a standard according to the first embodiment including cross-sections, FIG. 2 is a standard according to the second embodiment including cross-sections, FIG. 3 is a standard according to the third embodiment including cross-sections, FIG. 4 is a standard according to the fourth embodiment.

The standards according to the invention were made by the two-photon polymerization technique using the Photonics Professional GT (Nanoscribe GmbH) device, characterised by the following parameters: ×100 1.4 NA microscopic lens, positioning of the beam focus in relation to the photoresist by means of a 3-axis piezoelectric stage, femtosecond fibre laser (pulse duration 100 fs, pulse repetition rate 80 MHz, central wavelength: 780 nm); printing of subsequent layers of the structure occurs towards the lens.

Example 1

The standard shown in FIG. 1 has the shape of a truncated ellipsoid 30×25×11 μm in size (length, width, height). Base material 1 has a refractive index of 1.52. Within the standard's volume there are the following features:
   region 2 with a refractive index of 1.50 and a size of 9×6×6 μm,
   three ellipsoidal inclusions 3 distributed within region 2 with a refractive index of 1.52 and sizes from 2 to 4 μm,
   region 4 in the shape of a set of cuboids with a refractive index of 1.48 and size 4×1.5× from 0.3 to 0.7 μm, spaced at 0.6 to 1.4 μm,
   region 5 in the shape of a set of cuboids with a refractive index of 1.48 and size 4×1.5× from 0.3 to 0.7 μm, spaced at 0.6 to 1.4 μm,
   region 6 in the shape of a set of cuboids with a refractive index of 1.48 and size 3×3× from 0.8 to 1.4 μm, spaced at 1.5 to 2 μm,
   region 7 with gradient-based changes in the refractive index, varying from 1.50 to 1.52 and with a size of 4.5×4.5×3 μm.

Regions 4, 5 and 6 are resolution tests for directions X (5), Y (4) and Z (6).

The standard shown in FIG. 1 was obtained from the material that is commercially available under the name IP-L 780 (Nanoscribe GmbH).

The standard shown in FIG. 1 was obtained as follows:
1. A drop of IP-L 780 polymer was applied to the centre of the 170 μm thick, high-precision coverslip, which was then placed in the holder of the 3D printing device using the two-photon polymerisation method.
2. After focusing the optical system of the device on the glass-polymer interface, the line by line and layer by layer manufacturing procedure was started in accordance with the numerical definition of the structure, which consists of successive points in the coordinate system of the device as well as local and global process parameters.
3. Performance characteristics of the standard are primarily affected by the following process parameters: power of the polymerizing laser, scanning rate and spacing between subsequent voxels, lines, and layers. The indicated refractive index values have been achieved for the following set of parameters: average laser power of 0 mW for regions with a refractive index of 1.48, 13 mW for regions with a refractive index of 1.50, and 20 mW for regions with a refractive index of 1.52, scanning velocity of 70 µm/s, distance between voxels of 200 nm in the XY plane (plane of the glass-polymer interface) and 300 nm in the Z direction (along the axis of the optical system of the device). Analogous standard regions with refractive indices of 1.50 and 1.52 can be obtained for example with a constant laser power of 18 mW and a variable scanning velocity ranging from 150 to 50 µm/s, respectively.

4. At the end of the printing process, the coverslip with the structure was cleaned from the excess uncured polymer by submersion in isopropyl alcohol bath for 15 minutes.

Example 2

The standard shown in FIG. 2 has the shape of a truncated ellipsoid 60×50×15 µm in size. Base material 1 has a refractive index of 1.50. Within the standard's volume there are the following features:
- seven ellipsoidal regions 2 with a refractive index of 1.52 and a size of 1 to 10 µm,
- region 3 in the shape of 4 coaxial rings with diameters between 5 and 8 µm, thickness between 0.3 and 1 µm and a refractive index of 1.52,
- region 4 in the shape of a set of cuboids with a refractive index of 1.48 and size 6×6× from 1.5 to 3 µm, spaced at 3 to 5 µm.
- region 5 in the shape of a cuboid with dimensions of 12×10×4 µm and with gradient-based changes in refractive index values ranging from 1.50 to 1.52.

Regions 3 and 4 are resolution tests for directions X (3), Y (3) and Z (4).

Example 3

The standard shown in FIG. 3 has the shape of a truncated ellipsoid 30×25×11 µm in size. Base medium 1 has a refractive index of 1.52. Within the standard's volume there are the following features:
- region 2 in the shape of a set of cuboids with a refractive index of 1.48 and size 3×3× from 0.8 to 1.5 µm, spaced at 2 to 2.5 µm,
- region 3 in the shape of an ellipsoid with dimensions of 18×18×8 µm and a refractive index of 1.51, with regions 4 and 5 within it,
- region 4 in the shape of 2 ellipsoids with a refractive index of 1.50 and sizes in the range of 0, 5 to 4 µm,
- region 5 in the shape of prisms 2×5×4 µm in size, arranged in relation to each other like a Siemens star, with a refractive index of 1.50.

Regions 2 and 5 are resolution tests for directions X (5), Y (5) and Z (2).

Example 4

The standard shown in FIG. 4 is composed of three standard presented in Example 1, fabricated side by side and overlapping, similar to a cell colony.

The invention claimed is:

1. A refractive index distribution standard in the form of a three-dimensional object comprising in its volume a base medium and regions of variable size and distance with a refractive index different than that of the base medium, wherein the difference between the refractive index of said regions and the refractive index of the base medium is not greater than 0.04,
wherein said regions include at least: three first regions, a second region, and a third region,
wherein each of the first regions includes a set of at least two cuboids of variable size and distance, arranged parallel to each other and having a dimension in at least one direction similar to the resolving power of the measurement system under assessment, wherein said sets are oriented along respective perpendicular axes (X,Y,Z) for separate resolution assessment in each respective direction (X,Y,Z),
the second region is used for representing a cell nucleus and is ellipsoid-like or sphere-like in shape,
the third region has the shape of a cuboid or cylinder, and has gradient-based, slowly varying refractive index values, with a maximum refractive index variation range of 0.02,
wherein the base medium and the regions of the standard are made by means of two-photon polymerization process which uses a light beam to cure a photoreactive material in the form of a liquid substance in a highly localized and precise manner, and wherein the value of the refractive index at any point of the standard depends on the degree of polymerization of the photoreactive material and corresponds to a respective point of a predetermined three-dimensional numerical model of the standard.

2. The standard according to claim 1 characterised in that at least one sphere-like or ellipsoid-like second region is located within another region with a different refractive index relative to the ellipsoid-like or sphere-like second region and relative to the base medium.

3. The standard according to claim 1 characterised in that it furthermore comprises a region in the form of coaxial rings containing rings with a diameter ranging from 1 µm to 50 µm, with a thickness of each of the rings close to the resolving power of the measurement system to be evaluated.

4. The standard according to claim 1 characterised in that it contains a set of prisms arranged in relation to each other similar as in a Siemens star.

5. The standard according to claim 1 characterised in that it has external dimensions ranging from 5 µm to 300 µm in each of the three directions.

6. The standard according to claim 1 characterised in that each of the internal regions of the standard with a different refractive index has dimensions in the range from 50 nm to 250 µm in each of the three directions.

7. The standard according to claim 1 characterised in that the differences in refractive indices of individual regions range from 0.001 to 0.04.

8. The standard according to claim 1 characterised in that the values of the refractive index of the standard material range from 1.45 to 1.60.

9. The standard according to claim 1 characterised in that it has a shape similar to truncated ellipsoid.

10. The standard according to claim 1 characterised in that the standard represents a biological cell or a colony of cells.

\* \* \* \* \*